(12) United States Patent  
Tang

(10) Patent No.: US 8,698,900 B1
(45) Date of Patent: Apr. 15, 2014

(54) DISPLAY BUTTON KEY PRESSES ON DISPLAY DEVICE

(71) Applicant: EchoStar Technologies L.L.C., Englewood, CO (US)

(72) Inventor: Simon Tang, Aurora, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 13/731,769

(22) Filed: Dec. 31, 2012

(51) Int. Cl.
H04N 17/00 (2006.01)
H04N 5/445 (2011.01)

(52) U.S. Cl.
USPC .......... 348/180; 348/181; 348/194; 348/563; 348/564; 348/553; 717/124

(58) Field of Classification Search
USPC ......... 348/180, 181, 194, 563, 564, 565, 567, 348/189, 553; 455/423; 717/124, 126
See application file for complete search history.

(56) References Cited

U.S. PATENT DOCUMENTS

| | | | |
|---|---|---|---|
| 5,926,187 A | 7/1999 | Kim | |
| 7,312,803 B2 | 12/2007 | Wilkins | |
| 7,421,729 B2 | 9/2008 | Zenoni | |
| 7,911,494 B2 | 3/2011 | Park | |
| 8,180,644 B2 | 5/2012 | Garg et al. | |
| 2010/0262992 A1 | 10/2010 | Casagrande | |
| 2013/0152047 A1* | 6/2013 | Moorthi et al. | 717/124 |
| 2013/0304712 A1* | 11/2013 | Meijer et al. | 707/694 |

* cited by examiner

Primary Examiner — Jefferey Harold
Assistant Examiner — Jean W Desir
(74) Attorney, Agent, or Firm — Seed IP Law Group PLLC

(57) ABSTRACT

Disclosed is a method and apparatus for concurrently displaying on a display device, a selected main presentation and graphical shapes representative of button presses on a remote control. In one embodiment, the graphical shapes and the selected main presentation are displayed in two separate regions on the display screen. In another embodiment, the graphical shapes are overlaid on the selected main presentation. In yet another embodiment, the graphical shapes and the selected main presentation are displayed in a picture-in-picture format.

20 Claims, 7 Drawing Sheets

DISPLAY BUTTON KEY PRESSES ON DISPLAY DEVICE

BACKGROUND

1. Technical Field

This disclosure is generally directed at debugging tools. In particular, methods and systems to capture user input as graphical representation on a display screen are presented. The various embodiments described herein provide techniques for presenting graphical representation of user input in association with the main presentation to end-users.

2. Description of the Related Art

New releases of product software, hardware, or firmware entail extensive validation and verification. New features must be tested to ensure they function as expected without breaking or creating new issues to any previously released features. Debuggers are typically used during verification or during white box testing. These are computer programs to test or debug other programs (i.e., target program or the program under test). They examine the code modules as they are run on the actual hardware platform or on simulators. Debuggers are impractical, however, for validation, black box or product level functional testing, where full codes are run in real time on the full hardware implementation. Generally, validation, functional or black box testing is carried out by a tester, usually a human being, who tries very hard to "break" the product, find its weaknesses, and expose hidden defects. When the tester discovers a bug, he or she would write up the bug, narrating what happened before the bug occurred, under what condition the bug occurred, and in particular, the exact steps the tester went through to cause the bug to occur. Because only bugs that can be consistently reproduced are addressed and eventually fixed, it is generally desirable to ensure bug reproducibility. This is, however, difficult to achieve due to the variance between input from multiple testers and each tester's recollection of the test sequence. A tester may not recall the exact sequence of buttons pressed during testing, or know if there was repetition of a button press, or if there was an intended button press between intentional button presses.

BRIEF SUMMARY

The present disclosure provides a debugging tool that captures the exact input a tester provides to the product under test, or the exact sequence of button presses. To preserve the test environment and input sequences, the captured information about the button presses is recorded for later review and analysis at the same time a record is made of the system's response to each button press.

The present disclosure also provides a method carried out at a client device for displaying key presses on a display device. In one embodiment, the method includes receiving an indication to place the client device in a TEST mode, displaying a first video signal, receiving a sequence of commands representing a sequence of button presses on a remote control to modify the first video signal, and then modifying the first video signal based on the received sequence of commands. The method further includes translating the sequence of commands into a sequence of data objects, each command being translated into one data object unique to the button press represented by the command, rendering each data object as a distinctive graphical shape for display on the display device, and creating a second video signal for display on a second region of the display screen of the display device, the second video signal having the sequence of data objects synchronized with the first video signal.

In one aspect of the embodiment, the method further includes generating a modified output transmission for display on the display device, the modified output transmission including the modified first video signal and the second video signal, the modified first video signal being displayed on the first region of the display device and the second video signal being displayed on a second region of the display device.

A device to display button key presses together with the immediate effects of those key presses on a video output signal on a display device is another embodiment of the present disclosure. The device includes a processing section having a video sourcing section for selecting a source for output as a first video signal, an input capture section for determining a command from a received input, an input processing section for modifying the first video signal based on the determined command, a translation section for determining which button was pressed on a remote control and translating the received input into a data object associated with the determined button, the data object renderable as a graphical shape on a display page together with the video.

In one aspect of the embodiment, the device further includes a memory section for storing a plurality of data objects, each data object representing one button on the remote control, an auxiliary signal generator for creating an auxiliary signal that includes the data object, and a video processing section for combining and synchronizing the auxiliary signal with the modified first video signal into an output transmission signal, the output transmission signal renderable to concurrently display the modified first video signal in a first region of a display device and the auxiliary signal as the graphical shape in a second region of the display device.

In another aspect of the embodiment, the device also includes a transceiving section for receiving the input from the remote control, a tuning section for receiving a live programming, a programming storage section for storing a program recording, and an electronic program guide section for generating an electronic programming guide. Live programming, program recording or the electronic programming guide may be the source of the first video signal.

Another embodiment of the present disclosure may be another method to display button key presses on a display device that includes transmitting an output transmission to a display device, the output transmission carrying a main presentation for display on a first region of the display device, receiving a first command for controlling the client device, the first command representing a first button press on a remote control, and concurrently processing the received first command and translating the received first command into a first data object, the first data object unique to the first command. The method further includes, upon processing the received first command, modifying the main presentation based on the received first command, rendering the first data object as a first graphical shape, and upon modifying the main presentation, transmitting the output transmission to the display device, the output transmission including the modified main presentation and the first graphical shape, the modified main presentation being for display on the first region of the display device and the first graphical shape being for display on a second region of the display device. The method continues with receiving a second command for controlling the client device, the second command representing a second button press on the remote control, and concurrently processing the received second command and translating the second command into a second data object, the second data object unique to the second command, rendering the second data object as a second graphical shape, and upon processing the received second command, further modifying the modified main presentation based on the received second command. The method also includes, upon further modifying the modified main presentation, transmitting the output transmission to the display device, the output transmission including the further modified main presentation, the first graphical shape and the second graphical shape, the further modified main presentation being for display on the first region of the display device, the first graphical shape and the second graphical shape being for display on the second region of the display, concurrent with the display of the further modified main presentation.

BRIEF DESCRIPTION OF THE SEVERAL
VIEWS OF THE DRAWINGS

DETAILED DESCRIPTION

Figure 1:
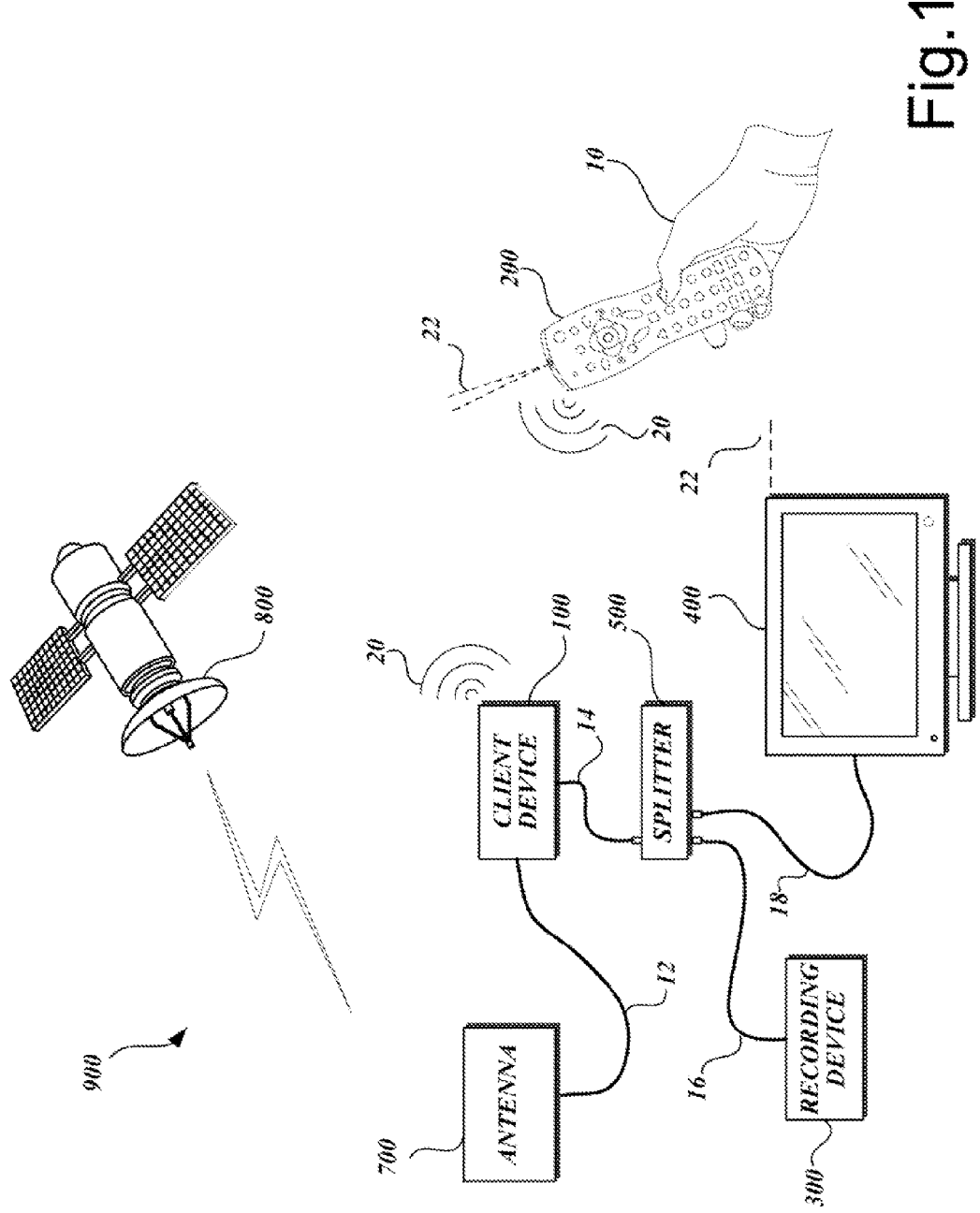
FIG. 1 illustrates an exemplary setup in which an embodiment of the present disclosure may be implemented.

In the following description, certain specific details are set forth in order to provide a thorough understanding of various embodiments of the disclosure. However, one skilled in the art will understand that the disclosure may be practiced without these specific details. In some instances, well-known interfaces have not been described in detail to avoid obscuring the description of the embodiments of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1 illustrates a typical test setup 900 in which an embodiment of the present disclosure is deployed. The typical test setup 900 in FIG. 1 includes a user 10 who operates a remote control 200, a client device 100 that receives commands from the remote control 200 over wireless communication link 20 and content from a satellite antenna 700 over cable system 12, the satellite antenna 700 configured to receive a satellite transmission signal on a transponder from a satellite 800. Client device 100 may also receive contents from other distribution systems, such as cable and other broadband providers. In the embodiment, the test setup 900 also includes a signal splitter 500 that receives an output signal from the client device 100 over cable system 14 and transmits at least two signals identical to the output signal from client device 100, the first duplicate output signal transmitted over cable system 16 may be provided to recording device 300, and the second duplicate output signal transmitted cable system 18 may be provided to display device 400. The signal splitter 500 may be a 2-way signal splitter, a 4-way signal splitter, or other means to duplicate the received output signal from client device 100 so that multiple identical signals may be provided to multiple devices. Signal splitter 500 may have a variety of ports to couple to cable system 14 to accept an output signal from client device 100 and a variety of ports to couple to cable system 16 and cable system 18 to transmit the multiple duplicate signals. Signal splitter 500 may have analog receive and transmit ports. It is also contemplated that signal splitter 500 may have a combination of analog and digital ports for its receive and transmit ports.

User 10 may use remote control 200 to communicate with and control client device 100 over wireless communication link 20 and to communicate with display device 400 over wireless communication link 22. User 10 may also use remote control 200 to communicate with and control other electronic devices that may be included in the test setup 900, such as a DVD player (not shown), a CD player (not shown), or an audio amplifier (not shown) over a variety of communication links. Wireless communication link 20 may be a radio frequency link. In a preferred embodiment, wireless communication link 20 is a ZigBee RF4CE compliant communication link. It is, however, understood that other radio frequency communication protocols, such as Bluetooth, Wi-Fi and NFC, may be used as wireless communication link 20. It is also contemplated that the wireless communication link 20 may be an optical communication means.

Client device 100 may be configured to output a signal containing menu, an electronic program guide, live programming or recorded programming. Client device 100 may transmit the output signal over a variety of audio/video links, such as an analog link or a digital link. Examples of an analog link are component analog video (CAV, Y/Pb/Pr), composite video, analog audio, s-video, and SCART. Examples of a digital link are HDMI, DVI, and Digital Audio. In a preferred embodiment, the client device 100 transmits the output signal over HDMI.

Display device 400 may be any electronic device capable of at least presenting a video on a display screen. Some embodiments of display device 400 may also output audio. The cable system 18 provided between signal splitter 500 and display device 400 may carry the second duplicate output signal over an analog or digital link. Examples of different analog and digital links were described in previous paragraphs. In a preferred embodiment, display device 400 is a television that receives the second duplicate output signal over an HDMI, the television having speakers to output audio.

The wireless communication link 22 may be an optical or a radio frequency link. In a preferred embodiment, remote control 200 controls display device 400 using an infrared protocol, such as IrDA. It is, however, contemplated, that remote control 200 may use radio frequency communication to control display device 400, the radio frequency communication may be compliant to any standard radio frequency protocol such as ZigBee RF4CE, Wi-Fi and NFC.

Recording device 300 may be any electronic device capable of receiving video and audio signals, storing them in a long-term storage such as a hard disk, and retrieving and outputting them on demand. In a preferred embodiment, recording device 300 is a device similar to client device 100 and records all actions taken by the client device 100, all input to it as well as all output from it.

In an alternate test setup (not shown), the recording device 300 is a camera recorder configured to capture the video and other images being displayed on the display device 400 throughout the testing period. The resulting recording may then be reproduced and reviewed to assist in a debugging effort.

The typical test setup 900 illustrated in FIG. 1 is set up for a product functional test designed to verify and/or validate new or modified software and/or hardware in client device 100. It is contemplated that user 10 may be given a strict procedure to follow or be given only a general direction to test the client device 100. Client device 100 is placed in a TEST mode before the testing is commenced and recording device 300 placed in record mode as soon as testing is commenced. As user 10 begins to interact with client device 100 by selecting a main presentation for display on display device 400, client device 100 starts transmitting output signal. As display device 400 begins to display the selected main presentation, recording device 300 begins recording the selected main presentation. As user 10 interacts with client device 100 using remote control 200, each button press on remote control 200 that represents a command is displayed as a graphical shape on the display screen of display device 400. Recording device 300 continuously records everything that is displayed on the display screen of display device 400, which includes the main presentation as it is being modified with each command, as well as the displayed graphical shapes. A recorded video and/or audio in recording device 300 may be reviewed at a later time to study the sequence of button presses and the resulting events or modification to the main presentation that occurred during testing. In particular, the video recorded by recording device 300 would be reviewed to see what particular button or buttons on the remote control 200 was or were pressed prior to a certain event of interest. In a preferred embodiment, only commands directed to client device 100 from remote control 200 are of interest and displayed on the display device 400. It is contemplated however, that ANY button press on remote control 200 may be of interest and its graphical representation displayed on the display device 400.

Figure 2:
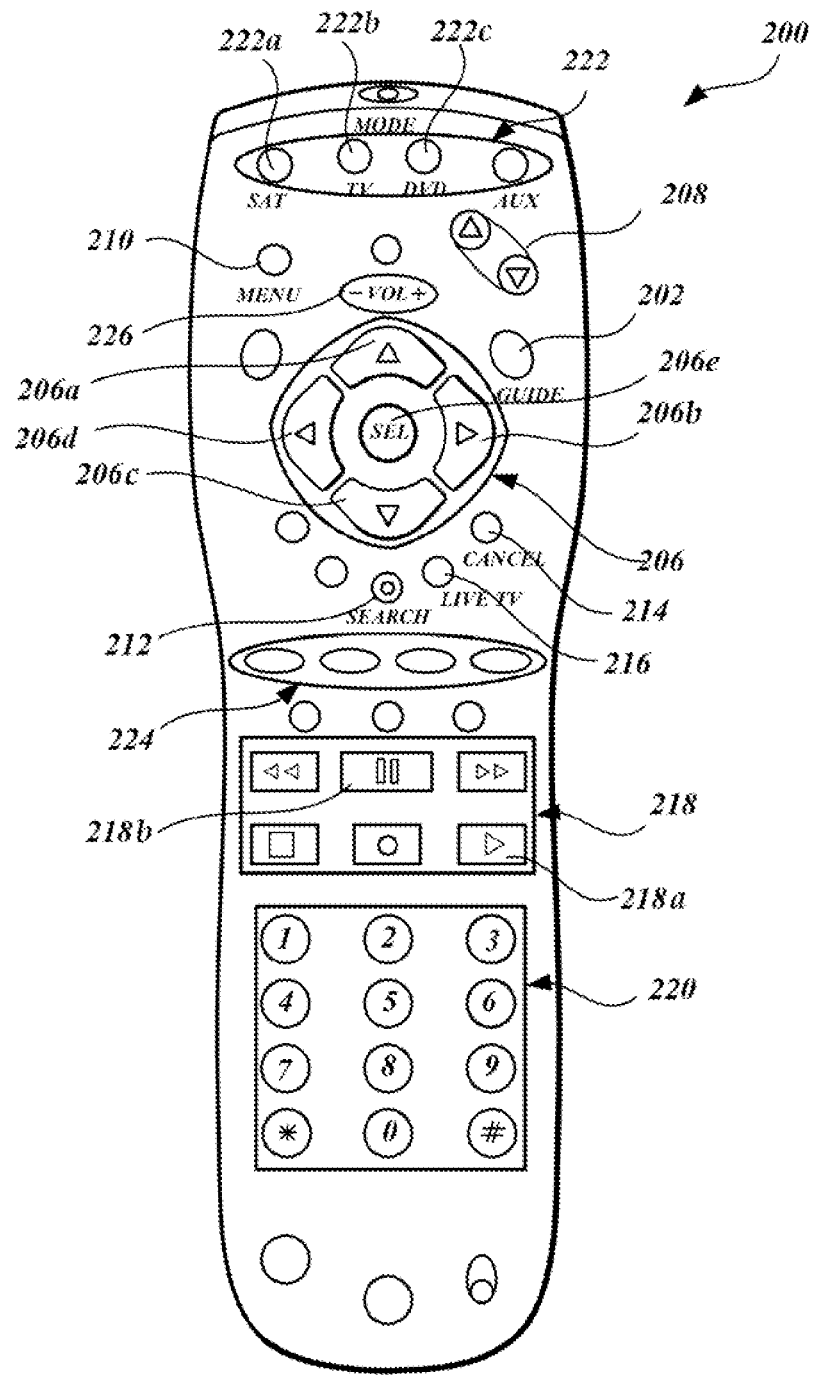
FIG. 2 illustrates various buttons on a typical remote control used for an embodiment of the present disclosure.

FIG. 2 shows some exemplary buttons that may be found on remote control 200. Some of the buttons are used to communicate with client device 100, while others are used to communicate with other electronic devices, such as display device 400, a DVD player (not shown) or an amplifier (not shown), that may be part of a system setup. Some buttons on remote control 200 function differently in different mode. MODE buttons 222 is used to put remote control 200 in a particular mode. In a preferred embodiment, remote control 200 is placed in SAT mode by selecting SAT button 222a, enabling a communication with client device 100. In SAT mode, GUIDE button 202 causes a display of current and future program listings and PAGE UP/DOWN buttons 208 cause the displayed listing to be paged up or down. In SAT mode, ARROW/SELECT buttons 206 is used to navigate through menus and to select a desired option; the UP ARROW button 206a to navigate up, the RIGHT ARROW button 206b to navigate to the right, the DOWN ARROW button 206c to navigate down, the LEFT ARROW button 206d to navigate to the left, and the SELECT button 206e to make the selection. In SAT mode, MENU button 210 accesses the features and setting of client device 100 and SEARCH button 212 allows a user to search for a particular program. In SAT mode, CANCEL button 214 and VIEW LIVE TV button 216 cause the user 10 to exit out of any menu or guide and return to watch a live TV program. In SAT mode, DVR buttons 218 are used to control the DVR functionality of the client device 100; PAUSE button 218b to pause live TV and PLAY button 218a to play back a programming. In SAT mode, number buttons 220 are used to enter a channel number or to navigate through menus and program guides. In SAT mode, Special Function buttons 224 function as shortcuts to frequently used menus. To enable remote control 200 to control a television, TV mode button 222b is selected. In TV mode, VOLUME buttons 226 are used to adjust TV audio volume and number buttons 220 are used to enter a channel number for the TV. To enable remote control 200 to control a DVD or Blu-Ray player, DVD mode button 222c is selected. In DVD mode, number buttons 220 are used to select a chapter in the DVD, PLAY button 218a to play a DVD disc, and PAUSE button 218b to pause the DVD disc. In a preferred embodiment, unless remote control 200 is in SAT mode, client device 100 ignores all transmission from remote control 200. It is contemplated, however, that client device 100 acknowledges, receives, and processes ALL transmissions from remote control 200 regardless of the mode of remote control 200.

Figure 3A:
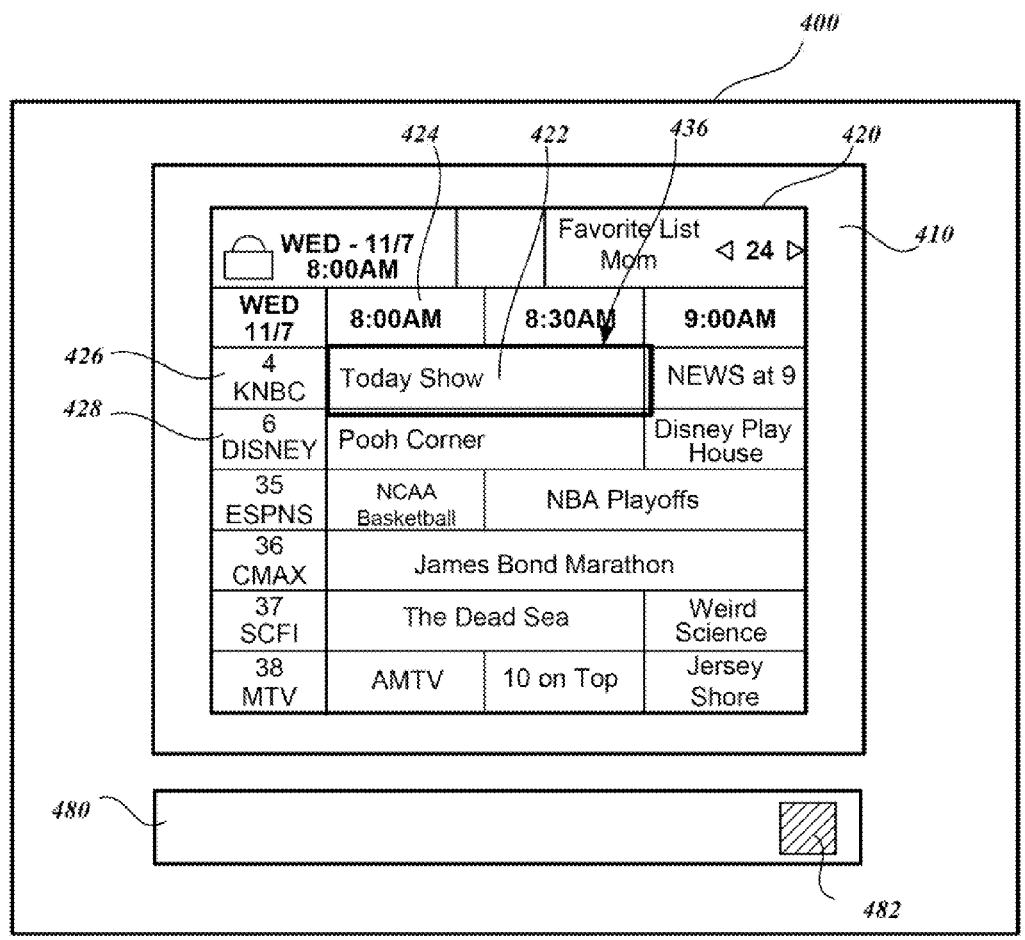
FIGS. 3A, 3B and 3C illustrate exemplary sequential screen shots of a display device in an embodiment of the present disclosure.
Figure 3B:
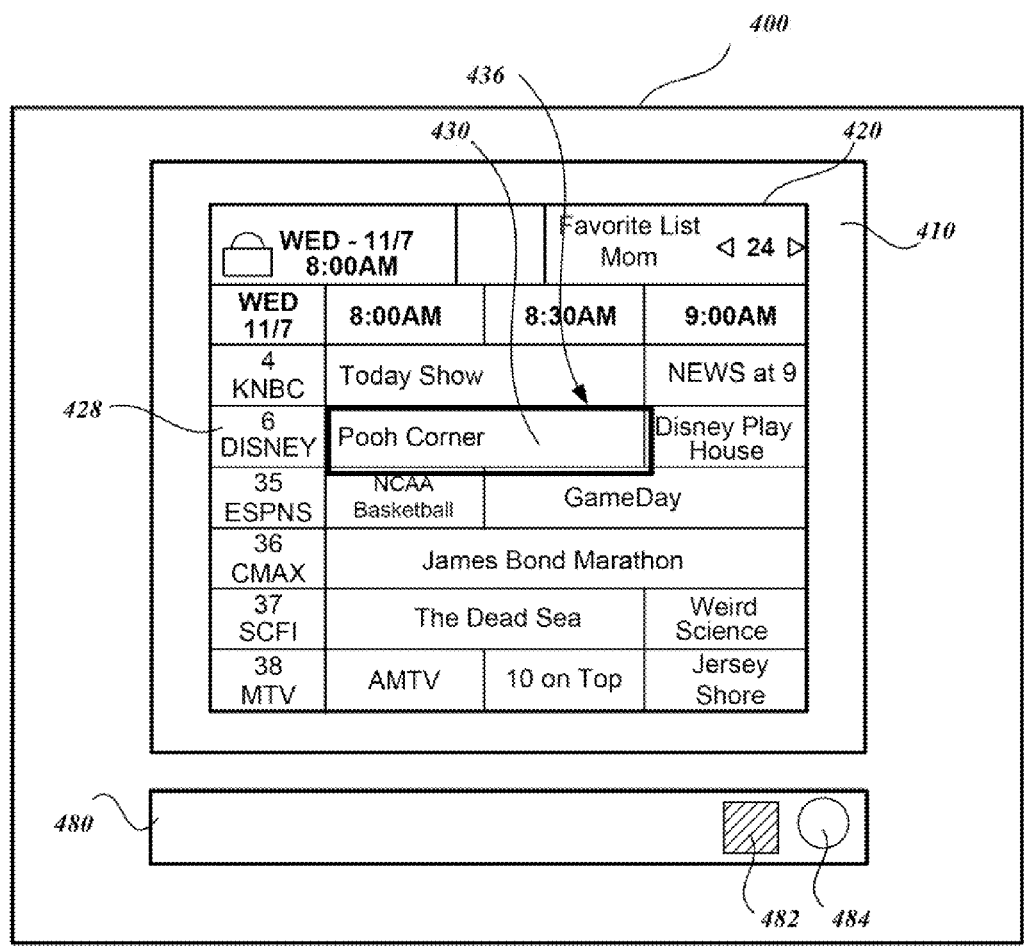
Figure 3C:
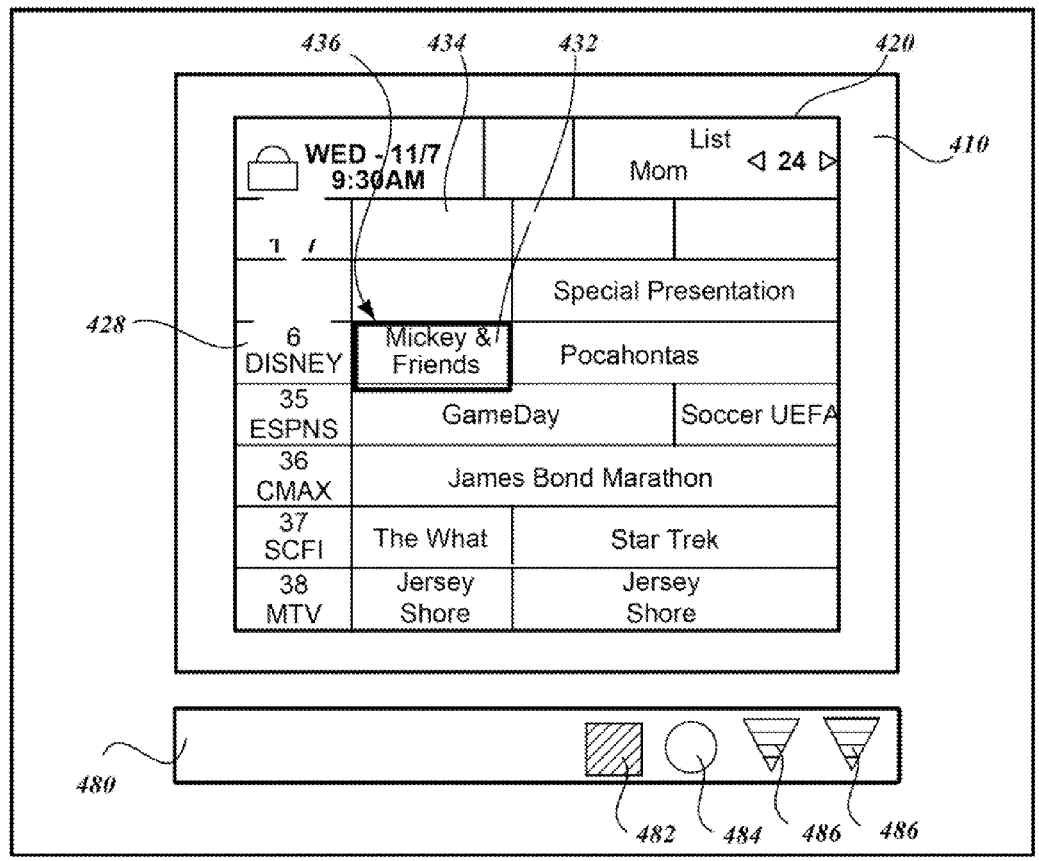

FIGS. 3A, 3B and 3C illustrate the sequence of changes on the display screen of display device 400 during an exemplary test sequence in which an embodiment of the present disclosure is deployed. FIG. 3A illustrates the event that may transpire at time 0 in one preferred embodiment. At time 0, user 10 presses the GUIDE button 202 on remote control 200, and an electronic program guide (EPG) 420 appears on the display screen of display device 400. However, because client device 100 is in TEST mode, instead of occupying the whole display screen, EPG 420 is displayed only in the first region 410 of the display screen. The second region 480 of the display screen displays a first graphical shape 482, the first graphical shape 482 representing an actuation of GUIDE button 202 on remote control 200. The display screen concurrently presents the EPG 420 and the first graphical shape 482. Other arrangements of the two regions on the display screen are also possible.

First graphical shape 482 may be a random shape, filled or outline, an alpha-numeric character, filled or outline, or a geometric shape, filled or outline. First graphical shape 482 may also be colored or time stamped or both. It is contemplated that the first graphical shape 482 may be a representation of any data object, as long as it is uniquely associated with an actuation of GUIDE button 202 on remote control 200. If GUIDE button 202 is pressed three (3) times, three of the same first graphical shape 482 may be displayed in a row in the second region 480 of the display screen. In FIG. 3A, at time 0, the EPG 420 displays a plurality of timeslot, one of which is the 8:00 AM timeslot 424. For each timeslot, a plurality of program information are listed, each associated with one channel identifier. EPG 420 in FIG. 3A shows channel 4 KNBC 426 and channel 6 DISNEY 428 in EPG 420 are examples of channel identifiers, and TODAY SHOW 422 is a program information associated with channel 4 KNBC under the 8:00 AM timeslot 424. EPG 420 in FIG. 3A indicates that "TODAY SHOW" 422 that at 8:00 AM on Wednesday, November 7, "TODAY SHOW" 422 is available on channel 4 KNBC 426. A selection indicator 436 may be initially positioned on a program information when EPG 420 is first invoked. In FIG. 3A, selection indicator 436 is initially positioned on TODAY SHOW 422 for illustrative purposes. The selection indicator 436 may be used by user 10 to navigate through the EPG 420.

After viewing the EPG 420, at time 1, user 10 desires to know what will be available on channel 6 DISNEY at 9:30 AM, and to do so, user 10 would navigate through the EPG 420 to a different channel identifier and to a different timeslot.

At time 1, user 10 selects the row associated with channel 6 DISNEY 428, which on the EPG 420 is the row below channel 4 KNBC 426, by pressing the DOWN ARROW button 206c on remote control 200. FIG. 3B shows that at time 1, the first region 410 displays a modified EPG 420 with the selection indicator 436 moved to highlight program information "POOH CORNER" 430 as the result of user 10 actuating the DOWN ARROW button 206c once on remote control 200. At time 1, in addition to the first graphical shape 482, a second graphical shape 484 is displayed in the second region 480 of the display screen. The second graphical shape 484 is distinguished from the first graphical shape 482 because the second graphical shape 484 represents an actuation of a button different from the GUIDE button 202 on remote control 200.

Because the EPG 420 on the first region 410 only shows program listings for 8 AM, 830 AM and 9 AM, user 10 has to traverse more timeslots to see the available programming at 9:30 AM, and at time 2, user 10 proceeds to press the RIGHT ARROW button 206b on remote control 200. The first press moves the selection indicator 436 to the right by one time slot, which in this particular example is the 9:00 AM time slot, and "Disney Playhouse" would be highlighted (not shown). But to see what is on channel 6 DISNEY at 9:30 AM, user 10 has to press the RIGHT ARROW button 206b for a second time, at time 3.

As illustrated in FIG. 3C, at time 3, EPG 420 in the first region 410 of the display screen shows a plurality of timeslots starting with the 9:30 AM time slot 434. The program information "Mickey and Friends" 432 is highlighted with the selection indicator 436; this is the program that will be available on channel 6 DISNEY 428 at 9:30 AM on Wednesday, November 7. At time 3, the second region 480 of the display screen displays four (4) graphical shapes; the first graphical shape 482 representing the actuation of the GUIDE button at time 0, second graphical shape 484 representing the actuation of the DOWN ARROW button 206c at time 1, and two of a third graphical shape 486, the first third graphical shape 486 representing the first actuation of the RIGHT ARROW button 206b at time 3, and the second third graphical shape representing the second actuation of the RIGHT ARROW button 206b at time 3. The third graphical shape 486 is distinguished from the first graphical shape 482 and the second graphical shape 484. Although not shown in the figures, the first of the two third graphical shapes 486 is displayed in the second region 480 at time 2 when user 10 presses the RIGHT ARROW button 206b for the first time. As the main presentation presented on the first region 410 of the display screen is modified or changed due to user 10 actuating a button on remote control 200, a graphical representation of the actuated button is displayed in the second region 480 of the display screen. Each button actuation is represented with an appearance of one graphical shape, and each button may be represented by one unique graphical shape. A sequence of button presses is represented by a sequence of graphical shapes in the second region 480 of the display screen, the sequence of graphical shapes being arranged in the order of the actuation of the buttons, the most recent button actuation may be represented with a graphical shape on the right end of the second region 480. In the event that graphical shapes accumulate in the second region 480 to the point that they fill out the second region 480, the oldest graphical shape may be scrolled off the second region 480 to make space for a newer graphical shape. Other arrangements of the graphical shapes in the second region 480 are also contemplated, however. For example, graphical shapes may be allowed to wrap around as new graphical shapes are added, resulting in multiple lines of graphical shapes.

How the display screen is divided to show the main presentation and the graphical shapes may vary with different embodiments. The first region 410 may be on above the second region 480 as illustrated in FIGS. 3A, 3B, and 3C. In another embodiment, first region 410 may be below the second region 480. In other embodiments, the display screen may be divided into more than two region, be divided into vertical regions (left and right), or be arranged in overlapping regions. It is also contemplated that the graphical shapes be overlaid on the main presentation.

While EPG 420 is used in the example illustrated in FIGS. 3A, 3B and 3C, other video presentation, such as live TV programming or a TV recording may be the source to be displayed as the main presentation.

Figure 4:
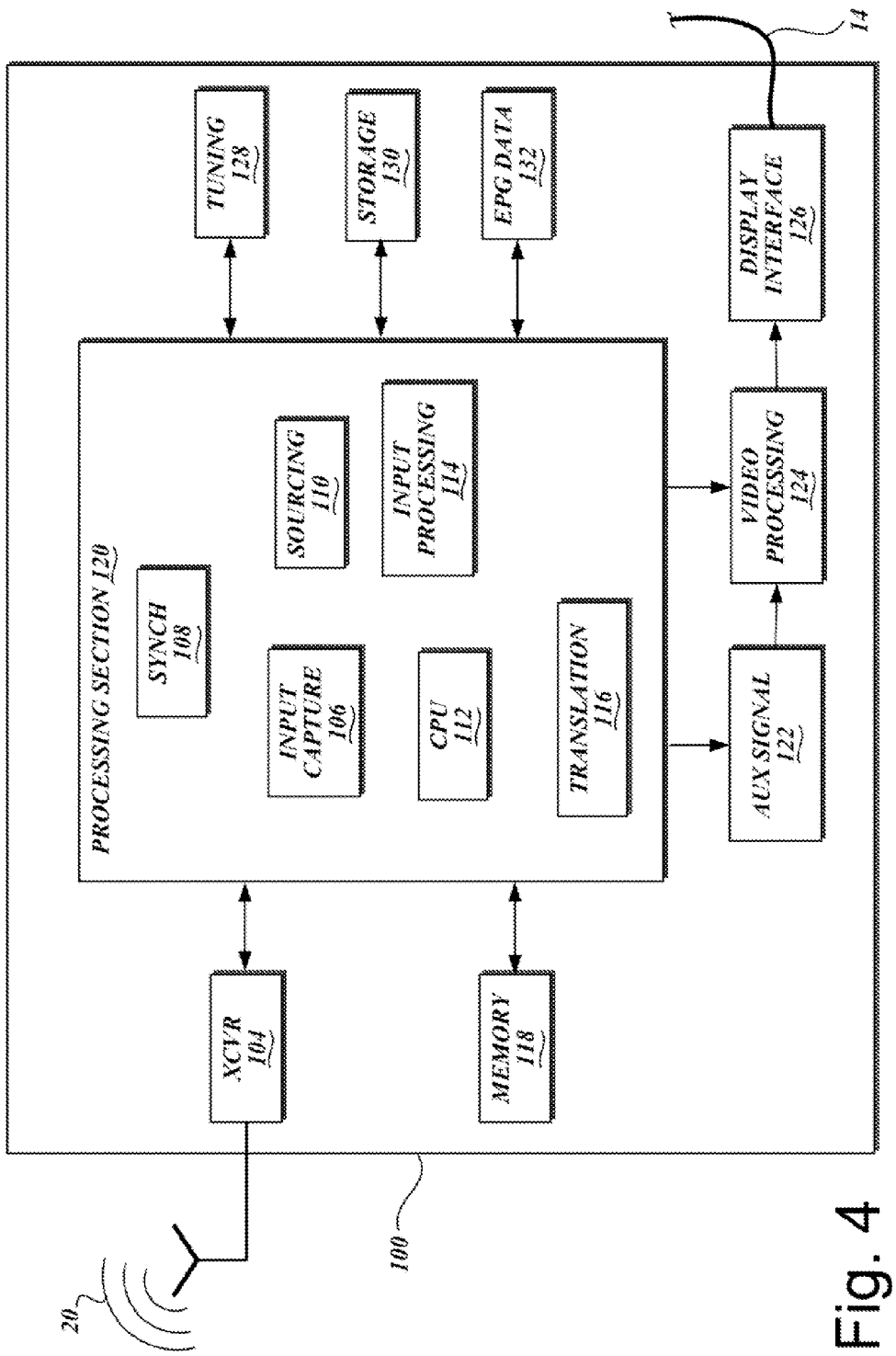
FIG. 4 illustrates a schematic block diagram of one embodiment of a client device in the present disclosure.

FIG. 4 is an exemplary schematic block diagram illustrating an embodiment of the present disclosure in client device 100. One skilled in the art understands that this block diagram is not exhaustive, thus there may be more functional blocks included in a client device 100. One skilled in the art also understands that each functional block may be implemented in hardware, software, firmware of a combination thereof, and that some functional blocks may be combined. A shown in FIG. 4, a client device 100 includes a tuning section 128 and an EPG data section 132. In some embodiments, client device 100 may also include a storage section 130. Client device 100 may output a menu, an EPG, a live programming, or a recorded programming depending on a source selection made by user 10. Client device 100 also includes a transceiving section 104 configured to communicate with remote control 200 over the wireless link 20 which may be a radio frequency communication link or an optical communication link. Examples of radio frequency communication links were given in previous paragraphs. An optical communication link may be an infrared link. In a preferred embodiment, the wireless link 20 is a ZigBee RF4CE compliant communication. Client device 100 further includes a processing section 120 having an input capture section 106, a CPU section 112, a synchronization section 108, a sourcing section 110, an input processing section 114 and a translating section 116. The processing section 120 is coupled to the tuning section 128, storage section 130, EPG data section 132 and transceiving section 104. Client device 100 also includes memory section 118 coupled to the processing section 120. The processing section 120 is further coupled to an auxiliary signal generator section 122 and to a video processing section 124. To support a variety of display devices, the client device 100 includes a display interface section 126 which may have a plurality of connectors. Cable system 14 may be coupled to one of the plurality of connectors in the display interface section 126.

Tuning section 128 is configured to tune and receive program contents such as a television program. The tuning section 128 may receive an over-the-air broadcast signal, a direct broadcast satellite signal, a cable television signal or an internet protocol television signal. In a preferred embodiment, when user 10 selects a live TV program to watch, the tuning section 128 tunes to a transponder carrying a satellite signal that includes the selected TV program from a satellite content provider and extracts the selected TV program for further processing.

The storage section 130 may be an option in client device 100 that includes DVR functionality. The storage section 130 is configured to store recorded program contents. The storage section 130 may be internal or external to the content receiver 100, and may comprise a hard drive, optical drive, or solid state drive.

EPG data section 132 is configured to store electronic program guide data and other system information used by the client device 100. EPG data section 132 may comprise any type of nonvolatile memory device appropriate for storing said data.

Sourcing section 110 is configured to select a source to output as a main presentation on the display device 400 based on a command sent by the user 10 to the client device 100. The sent command indicates whether the user 10 wishes to view a live program, a recorded program, or a program guide. Upon receiving the command from user 10, sourcing section 110 selects the appropriate source and forwards it to the processing section 120. In the processing section 120, the selected source is processed to be the main presentation for output on display device 400. CPU section 112 in the processing section 120 is configured to oversee the functions within the processing section 120 and the interaction between the functional blocks within the processing section 120. CPU section 112 is configured to carry out additional processing of the main presentation; live programming may be 'paused' or 'recorded,' an EPG may be 'browsed', and a recorded program may be 'fast forwarded.'

User 10 controls the client device 100 by sending commands through certain button presses on the remote control 200, and with each button press, the remote control 200 transmits a signal containing a code representing the button press over the wireless communication link 20. Client device 100 receives the signal from remote control 200 via the transceiving section 104 and transmits the code in the signal to the input capture section 106. The input capture section 106 extracts and interprets the code for the client device 100. The input capture section 106 may process all commands or process only those commands directed to client device 100 while ignoring commands directed to other devices. A command directed to client device 100 causes the client device 100 to perform a specific function, such as modifying a presentation or to change a device setting. In a preferred embodiment, the input capture section 106 passes processed command concurrently to the input processing section 114 and to the translating section 116. In an alternative embodiment, the input capture section 106 passes all commands, even those not directed to client device 100, to the translating section 116. It is also contemplated that the input capture section 106 may pass the code representing the button press to the translating section instead of passing the interpreted and processed command.

Once a processed command indicating an operation to be performed on the main presentation is received, the input processing section 114 modifies the main presentation according to the indicated operation. The modified main presentation is subsequently forwarded to the video processing section 124.

The translating section 116 is configured to translate a received command to a data object. In a preferred embodiment, each command is associated with a unique data object renderable as a unique graphical shape. Each button press on remote control 200, therefore, is associated with a unique data object and a unique graphical shape. In a preferred embodiment, the data objects associated with a plurality of button presses are contained in a look up table, and the translating section 116 uses such look up table to translate the received command to an associated data object. Memory section 118 is coupled to the translating section 116, and may be configured to store the look up table containing the data objects and their associations with the plurality of button presses.

Translating section 116 is further configured to forward the data object to the auxiliary signal generator section 122, which processes the data object into an auxiliary signal suitable for combining with the modified main presentation. The auxiliary signal containing a graphical shape as rendered from the received data object is then fed to the video processing section 124 to be combined with the modified main presentation. The video processing section 124 outputs the combined signal to the display interface section 126 for transmission over the cable system 14 to signal splitter 500 and subsequently to display device 400 and recording device 300.

The synchronization section 108 is configured to synchronize the output of each graphical shape in the auxiliary signal on the display screen with the appearance of the modified main presentation on the display screen. Because it is important to know which button press causes a change or modification in the main presentation, it is desirable to have the graphical shape that represents that button press appear as close in time with the appearance of the modified main presentation as possible. The synchronization section 108 may include an input data logger that keeps track of each user input received by client device 100 and logs them in a log file. The input data logger and log file may be used to generate a time-stamp or a synchronization signal. The time stamp generated may be used to enhance the graphical shape presented on the display screen. The synchronization section 108 is coupled to the CPU section 112 and to the video processing section 124.

In a preferred embodiment, the video processing section 124 combines the auxiliary signal and the modified main presentation in such a way that each would be displayed in a different region on the display screen of display device 400. The video processing section 124 may also alternate the transmission of the auxiliary signal with the transmission of the modified main presentation for a picture-in-picture configuration effect on the display screen of the display device 400. In another embodiment, the video processing section 124 encodes the auxiliary signal together with the modified main presentation into a composite video signal. It is also contemplated that the graphical shapes in the auxiliary signal may be overlaid over the modified main presentation. One skilled in the art would understand that there are many ways to place the graphical shapes in the auxiliary signal together with the modified main presentation on the display screen. The video processing section 124 may use the synchronization signal from the synchronization section 108 in combining the modified main presentation with graphical shapes in the auxiliary signal.

As user 10 presses another button on remote control 200 indicating another command for the client device 100, the process may repeat and (1) the modified main presentation may be further modified according to the new command, and (2) another data object is selected and transmitted to the auxiliary signal generator. The video processing section 124 then combines the further modified main presentation and the auxiliary signal that contains the previous graphical shape and a new graphical shape rendered from the received new command. In the preferred embodiment, display device 400 displays the further modified presentation concurrently with the two rendered graphical shapes.

With each new command, the main presentation may be further modified and the number of graphical shapes in the auxiliary signal increases. Client device 100 maintains the output of the sequence of graphical shapes in one region of the display screen of display device 400 as it outputs a modified or new main presentation in another region on the display screen of display device 400.

Figure 5:
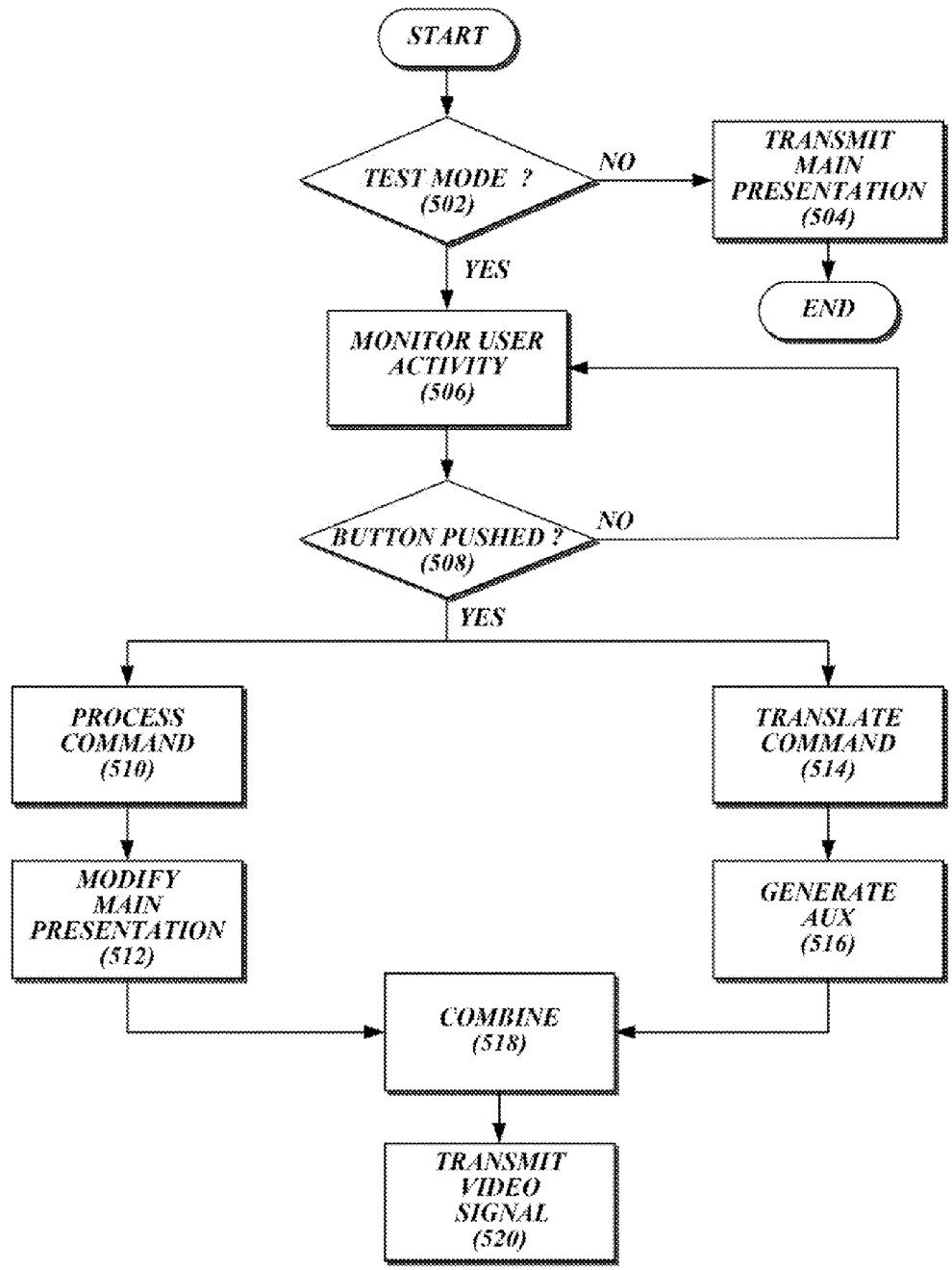
FIG. 5 is a process flow chart illustrating a process of an embodiment of the present disclosure.

FIG. 5 is a flow chart for a process of one embodiment of the present disclosure. Client device 100 may operate in normal mode or in TEST mode. Capturing a plurality of user input and displaying their representative graphical shapes on a display screen concurrent with displaying the main presentation may be a feature enabled only if the client device 100 is in a TEST mode. At a first decision point (S502), client device 100 checks if it has been placed in TEST mode. If the client device 100 has not been placed in TEST mode, then client device 100 may operate in normal mode and proceed to transmit any selected main presentation to display device 400 (S504). If client device 100 is in a TEST mode, then it proceeds to monitor user activity as it relates to the user's handling of the remote control 200 (S506). At a second decision point (S508), client device 100 checks if there is transmission from remote control 200 indicating a button press. A transmission from remote control 200 is detected by the transceiving section 104 in client device 100. Client device 100 continues to monitor for user activity if transceiving section 104 does not receive any transmission indicating a button press from remote control 200. When transceiving section 104 receives a transmission indicating a button press from remote control 200, the input capture section 106 processes the transmission by extracting and interpreting the command in the transmission (S510), and modifies a selected main presentation based on the received command (S512). The modified main presentation is then forwarded to the video processing section 124.

The translating section 116 translates the same command into a data object that would be rendered as a graphical shape representing the pressed button (S514). The graphical shape is unique to the pressed button and thus to the command transmitted from remote control 200. The graphical shape is placed in an auxiliary signal (S516) and forwarded to the video processing section 124.

The video processing section 124 combines the modified main presentation with the auxiliary signal containing the graphical shape into an output signal that is transmitted to display device 400 (S518). In a preferred embodiment, the video processing section 124 generates a video signal that would place the modified main presentation in a first region of a display screen and the graphical shape in a second region of the same display screen, the first region being above the second region. In the preferred embodiment, the region intended to show the graphical shape(s) contained in the auxiliary signals is completely separate from the region intended to show the modified main presentation. There are other techniques that may be employed by the video processing section 124 to generate an output signal that would concurrently display the graphical shapes representing the button presses and the modified main presentation on one display screen. Techniques such as overlaying the graphical shapes on the modified main presentation, picture-in-picture, or encoding the graphical shapes together with the modified main presentation may also be used. The output signal from the video processing section 124 may be further processed by the display interface section 126 to ensure it is in the proper format for transmission over the cable system 14 (S520).

When the user 10 presses another button on remote control 200 and the button press is intended as a command to client device 100, the process repeats from the second decision point (S508), and another graphical shape becomes part of the generated auxiliary signal.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   receiving, at a client device, an indication to place the client device in a TEST mode;
   transmitting, by the client device, an output transmission to a display device and to a recording device, the output transmission carrying a first video signal for display on a first region of the display device;
   generating, by the client device, a time code signal synchronized with the first video signal;
   receiving, at the client device, a sequence of commands for controlling the client device, the sequence of commands representing a sequence of button presses on a remote control;
   modifying, by the client device, the first video signal based on the received sequence of commands;
   translating, by the client device, the sequence of commands into a sequence of data objects, each command being translated to one data object unique to the button press represented by the command;
   rendering, by the client device, each data object as a distinctive graphical shape on the display device;
   creating, by the client device, a second video signal for display on a second region of the display device, the second video signal including the sequence of data objects synchronized with the first video signal using the time code signal;
   generating, by the client device, a modified output transmission for display on the display device, the modified output transmission including the modified first video signal and the second video signal, the modified first video signal being displayed on the first region of the display device and the second video signal being displayed on the second region of the display device; and
   transmitting, by the client device, the modified output transmission to the display device.

2. The method as claimed in claim 1, wherein
   the sequence of the data objects represents the sequence of commands received.

3. The method as claimed in claim 1, wherein generating comprises
   encoding the second video signal as an overlay to the modified first video signal.

4. The method as claimed in claim 1, wherein generating comprises
   mixing the second video signal and the first video signal as a picture-in-picture transmission signal.

5. The method as claimed in claim 1, wherein the translating comprises
   searching in a database in a memory for the unique data object associated with each button press.

6. The method as claimed in claim 1 further comprising
   marking the graphical shape with a time stamp, the time stamp derived from the time code signal.

7. The method as claimed in claim 1, wherein
   the first video signal is one of an electronic program guide, a live programming and a recorded program.

8. A device comprising:
a processing section coupled to a video source section, the processing section including:
  a video sourcing section configured to select a source for output as a first video signal;
  an input capture section configured to determine a command from a received input;
  an input processing section coupled to the input capture section, the input processing section configured to modify the first video signal based on the determined command;
  a translation section coupled to the input capture section, the translation section configured to determine a button pressed on a remote control from the received input and to translate the received input into a data object associated with the determined button, the data object renderable as a graphical shape on a display page;
a memory section coupled to the processing section, the memory section configured to store a plurality of data objects, each data object representing one button on the remote control;
an auxiliary signal generator coupled to the processing section, the auxiliary signal generator configured to create an auxiliary signal including each data object; and
a video processing section coupled to the input processing section and the auxiliary signal generator, the video processing section configured to combine and to synchronize the auxiliary signal with the modified first video signal into an output transmission signal, the output transmission signal being renderable to concurrently display the modified first video signal in a first region of a display device and the auxiliary signal as the graphical shape in a second region of the display device.

9. The device as claimed in claim 8 further comprising:
a transceiving section coupled to the processing section, the transceiving section configured to receive input from the remote control;
a tuning section coupled to the processing section, the tuning section configured to receive a live programming as the source;
a programming storage section coupled to the processing section, the programming storage section configured to store a program recording as the source; and
an electronic program guide section coupled to the processing section, the electronic program guide section configured to generate an electronic programming guide as the source.

10. The device as claimed in claim 8, wherein
the processing section further comprises
  a key logger section coupled to the input capture section, the key logger section configured to keep a record of each command determined from the received input, the record including a time stamp; and
the memory section further comprises:
  a test code section configured to store instructions executable in a TEST mode.

11. The device as claimed in claim 8, wherein
the video processing section is further configured to
  mix the auxiliary signal and the modified first video signal in a picture-in-picture video stream for transmission, the picture-in-picture video stream renderable to display the modified first video signal and the auxiliary signal in a picture-in-picture format.

12. The device as claimed in claim 8, wherein
the video processing section is further configured to
  encode the auxiliary signal in the modified first video signal.

13. A method comprising:
entering, by a client device, a TEST mode based on a first indication;
transmitting, by the client device, an output transmission to a display device, the output transmission carrying a main presentation for display on a first region of the display device;
receiving, at the client device, a first command for controlling the client device, the first command representing a first button press on a remote control;
concurrently, by the client device,
  processing the received first command and
  translating the received first command into a first data object, the first data object unique to the first command;
upon processing the received first command, modifying, by the client device, the main presentation based on the received first command;
rendering, by the client device, the first data object as a first graphical shape;
upon modifying the main presentation, transmitting, by the client device, the output transmission to the display device, the output transmission including the modified main presentation and the first graphical shape, the modified main presentation being for display on the first region of the display device and the first graphical shape being for display on a second region of the display device;
receiving, at the client device, a second command for controlling the client device, the second command representing a second button press on the remote control;
concurrently, by the client device,
  processing the received second command and
  translating the received second command into a second data object, the second data object unique to the second command;
rendering, by the client device, the second data object as a second graphical shape;
upon processing the received second command, further modifying, by the client device, the modified main presentation based on the received second command; and
upon further modifying the modified main presentation, transmitting, by the client device, the output transmission to the display device, the output transmission including the further modified main presentation, the first graphical shape and the second graphical shape, the further modified main presentation being for display on the first region of the display device, the first graphical shape and the second graphical shape being for display on the second region of the display device, concurrent with the display of the further modified main presentation.

14. The method as claimed in claim 13 further comprising
receiving, at the client device, a third command for controlling the client device, the third command representing a third button press on the remote control;
concurrently, by the client device,
  processing the received third command and
  translating the received third command into a third data object, the third data object unique to the third command;

upon processing the received third command, thirdly modifying, by the client device, the further modified main presentation based on the received third command;

rendering, by the client device, the third data object as a third graphical shape;

upon thirdly modifying the further modified main presentation, transmitting, by the client device, the output transmission to the display device, the output transmission including the thirdly modified main presentation, the first graphical shape, the second graphical shape and the third graphical shape, the thirdly modified main presentation being for display on the first region of the display device and the first graphical shape, second graphical shape and third graphical shape being for display on the second region of the display device, concurrent with the display of the thirdly modified main presentation.

15. The method as claimed in claim 13 further comprising arranging the modified main presentation and the first graphical shape in the output transmission as a picture-in-picture video signal.

16. The method as claimed in claim 13 wherein the main presentation is one of an electronic program guide, a live programming and a program recording.

17. The method as claimed in claim 13 further comprising synchronizing the display of the first graphical shape, the first graphical shape appearing on the display device concurrent with the display of the modified main presentation on the display device; and synchronizing the display of the second graphical shape, the second graphical shape appearing on the display device concurrent with the display of the further modified main presentation on the display device while maintaining the display of the first graphical shape on the display device.

18. The method as claimed in claim 14 further comprising synchronizing the display of the third graphical shape, the third graphical shape appearing on the display device concurrent with the display of the thirdly modified main presentation while maintaining the display of the first graphical shape and the second graphical shape on the display device.

19. The method as claimed in claim 13 further comprising causing, by the client device, a second client device to record the output transmission.

20. The method as claimed in claim 13 further comprising encoding the first graphical shape with the modified main presentation as one video signal in the output transmission.

* * * * *